United States Patent
Alzen

(10) Patent No.: US 11,493,929 B2
(45) Date of Patent: Nov. 8, 2022

(54) COMMUNICATION CHANNEL BETWEEN A ROBOTIC LAWNMOWER AND A CHARGING STATION

(71) Applicant: Globe (Jiangsu) Co., Ltd., Jiangsu (CN)

(72) Inventor: Jimmy Alzen, Norrahammar (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 490 days.

(21) Appl. No.: 16/499,491

(22) PCT Filed: Feb. 7, 2018

(86) PCT No.: PCT/CN2018/075511
§ 371 (c)(1),
(2) Date: Sep. 30, 2019

(87) PCT Pub. No.: WO2019/153132
PCT Pub. Date: Aug. 15, 2019

(65) Prior Publication Data
US 2020/0401155 A1  Dec. 24, 2020

(51) Int. Cl.
*G05D 1/02* (2020.01)
*B60L 53/12* (2019.01)
(Continued)

(52) U.S. Cl.
CPC ......... *G05D 1/0225* (2013.01); *A01D 34/001* (2013.01); *B60L 53/12* (2019.02);
(Continued)

(58) Field of Classification Search
CPC ............... G05D 1/0225; G05D 1/0022; G05D 2201/0208; A01D 34/001; A01D 69/02;
(Continued)

(56) References Cited

U.S. PATENT DOCUMENTS 9,606,541 B2  3/2017  Abramson
2005/0113972 A1  5/2005  Kumhyr
(Continued)

FOREIGN PATENT DOCUMENTS

CN  104793614 A  7/2015
CN  104798048 A  7/2015
(Continued)

OTHER PUBLICATIONS

Search Report and Written Opinion in related International Patent Application No. PCT/US2018/075511 dated Nov. 1, 2018; 10 pages.
(Continued)

*Primary Examiner* — Dac V Ha
(74) *Attorney, Agent, or Firm* — Rooney IP, LLC

(57) ABSTRACT

A bidirectional communication channel between a robotic lawnmower and a charging station for data communication between the robotic lawnmower and the charging station. The communication channel includes a first interface provided on the robotic lawnmower and a second interface provided on the charging station. The first and second interface are connected to each other through charging contacts and configured to communicate data in a Direct Current, DC-balanced way. Each interface is provided with an inductor in a charging power path between the charging station and the robotic lawnmower. Each inductor includes a high impedance for enabling a high data transmission rate for frequencies above 50 kHz.

8 Claims, 3 Drawing Sheets

(51) Int. Cl.
*B60L 53/66* (2019.01)
*G05D 1/00* (2006.01)
*H02J 50/80* (2016.01)
*A01D 34/00* (2006.01)

(52) U.S. Cl.
CPC ............ B60L 53/66 (2019.02); G05D 1/0022 (2013.01); H02J 50/80 (2016.02); *G05D 2201/0208* (2013.01)

(58) Field of Classification Search
CPC ....... A01D 34/008; B60L 53/12; B60L 53/66; B60L 53/14; B60L 2260/32; H02J 50/80; H02J 7/0044; Y02T 10/70; Y02T 10/7072; Y02T 90/12; Y02T 90/14; Y02T 90/16
See application file for complete search history.

(56) References Cited

U.S. PATENT DOCUMENTS

| | | | |
|---|---|---|---|
| 2008/0194963 A1* | 8/2008 | Randall | A61B 8/00 600/459 |
| 2010/0164579 A1* | 7/2010 | Acatrinei | H02M 1/4208 327/172 |
| 2012/0226381 A1* | 9/2012 | Abramson | B25J 9/0003 700/255 |
| 2015/0316913 A1* | 11/2015 | Rickey | G05B 15/02 700/180 |
| 2017/0127608 A1 | 5/2017 | Biber et al. | |
| 2018/0373258 A1* | 12/2018 | Fici | G05D 1/0276 |
| 2021/0061109 A1* | 3/2021 | Takahashi | B60L 50/64 |

FOREIGN PATENT DOCUMENTS

| EP | 1933467 A2 | 6/2008 |
|---|---|---|
| WO | 2017114571 A1 | 7/2017 |

OTHER PUBLICATIONS

European Patent Office, European Search with Search Opinion in European Patent Application 18905395.2, dated Mar. 9, 2020; 7 pages.

European Patent Office, European Office Action issued in European Patent Application 18905395.2, dated Sep. 16, 2021; 9 pages.

* cited by examiner

COMMUNICATION CHANNEL BETWEEN A ROBOTIC LAWNMOWER AND A CHARGING STATION

TECHNICAL FIELD

The present invention relates generally to a communication channel between a robotic lawnmower and a charging station, and more specifically a communication channel through which data can be sent to and from the robotic lawnmower and through which charging of the lawnmower is performed.

BACKGROUND ART

Robotic lawnmowers, also called self-propelled lawnmowers, are generally known. These robotic lawnmowers are provided with a rechargeable battery. When the remaining power in the battery is below a certain level the robotic lawnmower is programmed to return to the charging station to recharge the battery. In prior art, there are many different methods for returning the robotic lawnmower to the charging station. One common method is that the robotic lawnmower, when receiving a command to return to the charging station, continues its movement until a boundary wire is detected and then follows the boundary wire to the charging station that is provided somewhere along the boundary wire. When the robotic mower is close to the charging station a docking process is started such that the robotic mower is safely guided into contact with a charging connector of the charging station.

When the robotic lawnmower has reached and docked with the charging station the battery is charged via the charging connectors. In some prior art solutions, the charging process is also used to transmit data to the robotic mower by using the boundary wire as a communication channel. Transmitting data to the robotic lawnmower, but also from the robotic lawnmower to the charging station is used when there is a need to update software or alter the behavior of the robotic lawnmower or charging station.

U.S. Pat. No. 9,606,541 discloses a robot docking station and robot. There are two docking contacts between the robot and the docking station for charging.

These docking contacts may also be used for sending signals between the docking station and the robot. Thus, the docking contacts may also be used as a communication channel between the docking station and the robot. The system may either charge or send signals to the robot, but not both simultaneously.

US 2012/0226381 discloses a method for communication between a charging station and a robot, via a pair of power lines coupled between a power supply in the charging station and a battery in the robot. The communication of data may contrary to U.S. Pat. No. 9,606,541 be performed simultaneously as the robot is charged.

Thus, there are known different types of communication channels between a robotic lawnmower and a charging station. However, there is still room for improvements, especially when it comes to the speed with which data can be transmitted to and from the robotic lawnmower.

SUMMARY OF INVENTION

An object of the present invention is to provide a bidirectional communication channel between a robotic lawnmower and a charging station, said communication channel is simultaneously useable both for data communication to and from the robotic lawnmower and charging of the robotic lawnmower.

According to an aspect of the present invention this object is achieved by a bidirectional communication channel between a robotic lawnmower and a charging station for data communication between a first control unit in the robotic lawnmower and a second control unit in the charging station. The communication channel comprises a first interface with charging contacts provided on the robotic lawnmower and a second interface with charging contacts provided on the charging station. The first and second interface are connected to each other through said charging contacts and the first and second interface and the first and second control unit are configured to communicate data in a Direct Current, DC-balanced way. Furthermore, each interface is provided with an inductor in a charging power path between the charging station and the robotic lawnmower and each inductor has an impedance of at least 7 Ohm for frequencies above 50 kHz.

In an exemplary embodiment of the bidirectional communication channel, the first and second interface and the first and second control unit are configured to use Manchester encoding for DC-balancing the data transmission between the robotic lawnmower and the charging station. In another exemplary embodiment, the bidirectional communication channel is instead configured to use 8b/10b encoding for DC-balancing the data transmission between the robotic lawnmower and the charging station.

In yet another exemplary embodiment of the bidirectional communication channel, the first and second interface each comprise an amplifier with hysteresis configured to receive data, preferably in form of an amplifier and a Schmitt-trigger connected in series. The first and second interface may furthermore also each comprise an amplifier configured to amplify an outgoing signal.

Each inductor in the interfaces is in the range of 20-100 µH, preferably 47 µH.

Providing a bidirectional communication channel between a robotic lawnmower and a charging station, as described above, will allow data communication between the robotic lawnmower and the charging station simultaneously as a battery of the robotic mower is charged. By using inductors in the charging power path, one in the charging station and one in the robotic lawnmower, a high impedance at high frequencies is established, enabling communication between the robotic lawnmower and the charging station. With a high impedance it is possible to transmit data with high rates, such as 500 000 bits per second, between the robotic lawnmower and the charging station.

BRIEF DESCRIPTION OF DRAWINGS

The invention will now be described, by way of example, with reference to the accompanying drawings, in which:

FIG. 5 shows the connection between the robotic lawnmower and the charging station when establishing a communication channel therein between.

DESCRIPTION OF EMBODIMENTS

In the following, a detailed description of exemplary embodiments of a bidirectional communication channel between a robotic lawnmower and a charging station will be described.

Figure 1:
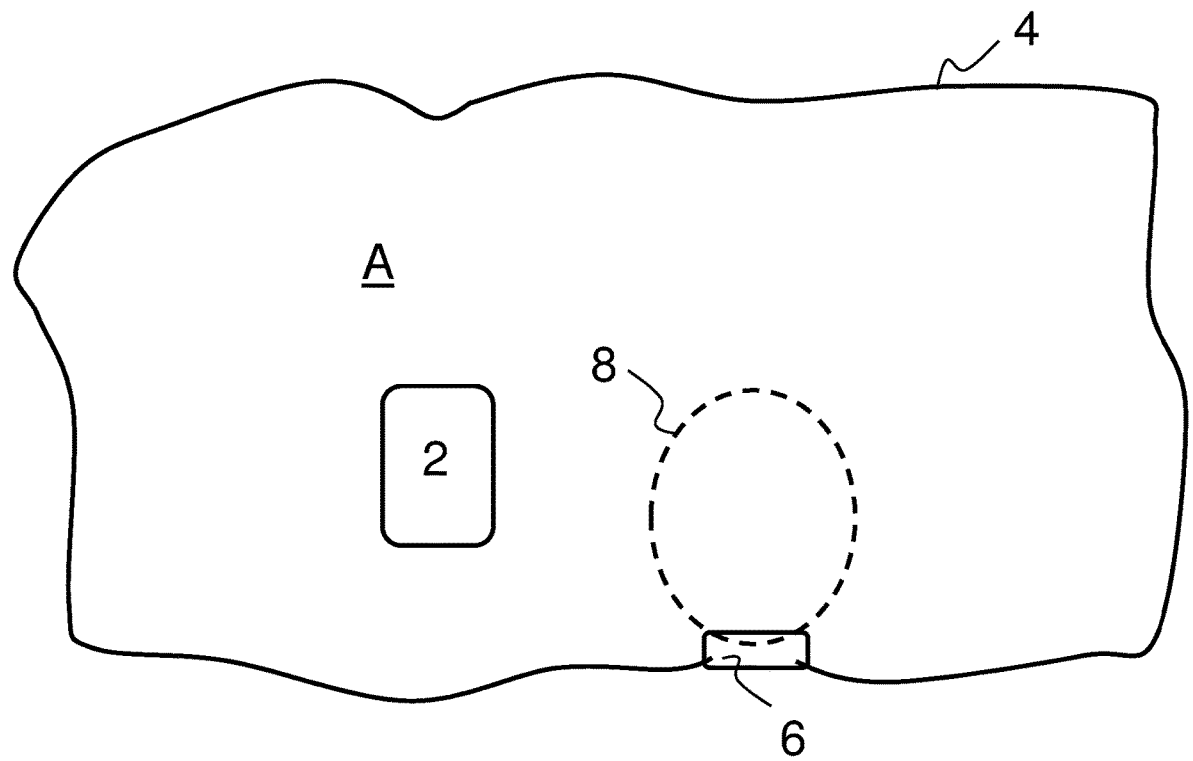
FIG. 1 a schematic view of a system comprising a robotic lawnmower, a charging station and a delimiting boundary wire.

FIG. 1 shows a system comprising a robotic lawnmower 2 which moves across an area A surrounded by a boundary wire 4. As is obvious the robotic lawnmower 2 is depicted somewhat enlarged for the sake of clarity. The boundary wire 4 may be configured in any way, such that it delimits the area A within which the robotic lawnmower 2 is allowed to move. The system also comprises a charging station 6 for charging a battery in the robotic lawnmower 2 when the battery needs to be recharged. During charging the robotic lawnmower 2 is docked to the charging station 6 via charging contacts and is positioned within the charging area 8. The charging station 6 may also comprise a signal generator which feeds the boundary wire 4 with an Alternating Current, AC, signal.

Figure 2:
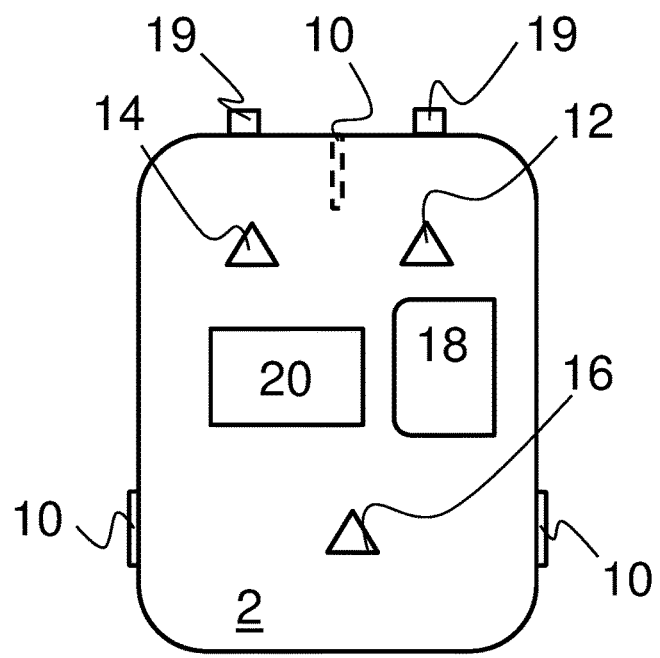
FIG. 2 is a schematic view of a lawnmower.

Turning now to FIG. 2, the lawnmower 2 will be closer described. The lawnmower 2 comprises a rechargeable battery 18, charging contacts 19, a control unit 20, wheels 10 and sensors 12, 14, 16. The control unit 20, which will be closer described in conjunction with FIG. 3, comprises among other things a processor 22 for controlling the movement, but also the charging, of the lawnmower 2. When the lawnmower 2 is in operation the sensors 12, 14, 16 sense the magnetic field that is generated in the boundary wire 4. The sensed magnetic field may be used to guide the robotic lawnmower 2 back to charging station, when the battery 18 needs to be charged, which is well known by a skilled person in the art.

Figure 3:
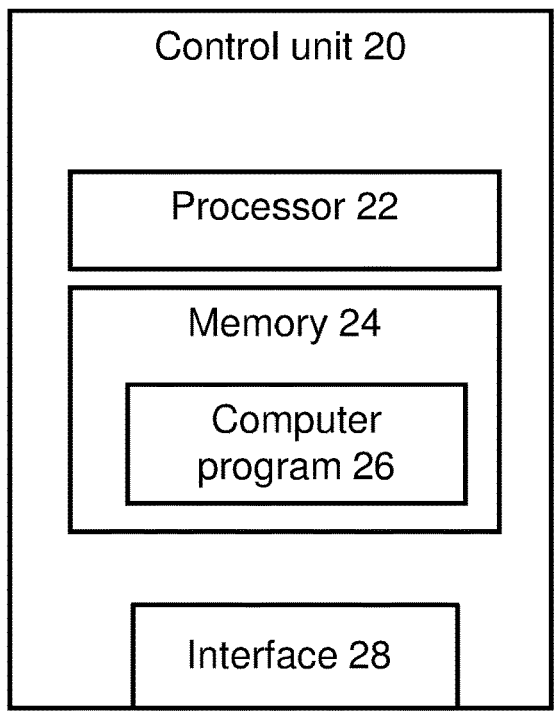
FIG. 3 is a schematic block diagram of a control unit in the lawnmower.

With reference to FIG. 3, the control unit 20 of the lawnmower 2 will be closer described. The control unit 20 comprises a processor 22 and a memory 24 and an interface 28, which interface 28 will be closer described in conjunction with FIG. 5. The memory 24 may comprise a computer program 26 comprising computer program code, i.e. instructions. The computer program code may be adapted to not only control the robotic lawnmower 2 within the delimited area A, but also the charging process when the robotic lawnmower 2 is docked to the charging station 6 and the transmission of data between the robotic lawnmower 2 and the charging station 6.

There are different types of data that one may wish to transmit to and from the robotic lawnmower 2. With the bidirectional communication channel according to the present invention there is no limit to what type of data that may be exchanged between the robotic lawnmower 2 and the charging station 6. For example, the robotic lawnmower 2 may send data to the charging station 6 instructing the charging station 6 to change its identification code or the charging station 6 may instruct the robotic lawnmower to alter its behaviour, for example how to return to the charging station 6. Other data that may be exchanged between the robotic lawnmower 2 and the charging station 6 may be test data when using the communication channel in a serial production test system.

The processor 22 may comprise a single Central Processing Unit (CPU), or could comprise two or more processing units. For example, the processor 22 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 22 may also comprise a storage for caching purposes.

Figure 4:
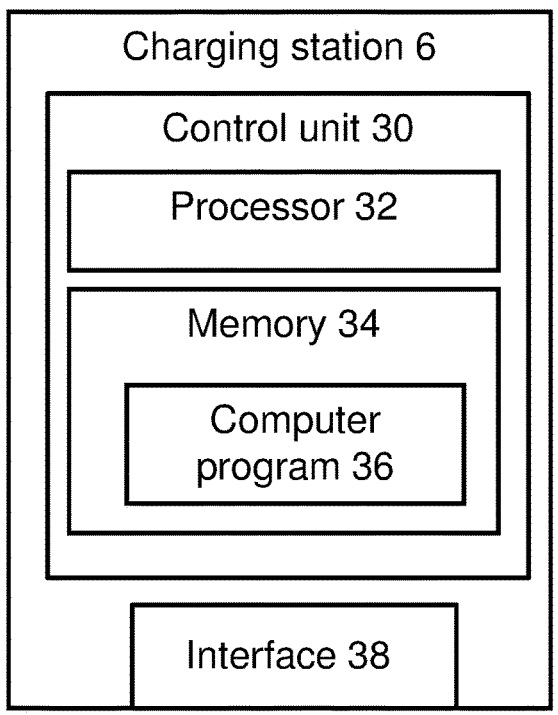
FIG. 4 is a schematic block diagram of a charging station.
Figure 5:
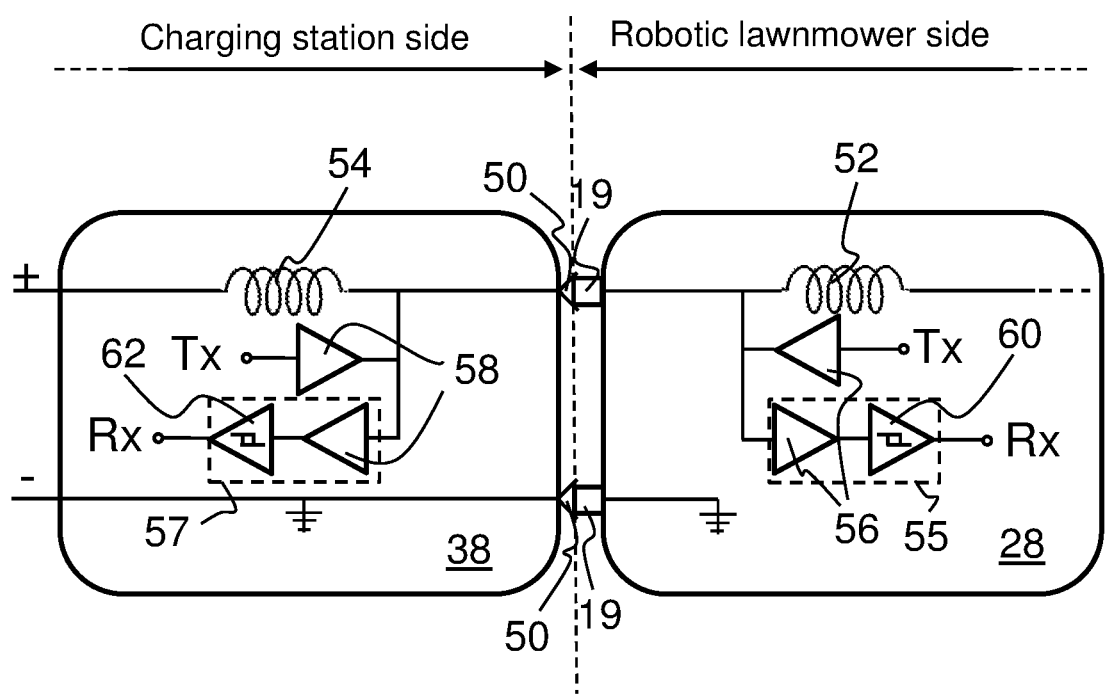

FIG. 4 depicts the charging station 6, which also comprises a control unit 30, with a processor 32 and a memory 34, and an interface 38, which interface 38 will be closer described in conjunction with FIG. 5. The memory 34 may comprise a computer program 36 comprising computer program code, i.e. instructions. The computer program code may be adapted to control the charging process of the charging station 6 when the robotic lawnmower 2 is docked to the charging station 6 and the transmission of data between the robotic lawnmower 2 and the charging station 6.

As for processor 22 also the processor 30 may comprise a single Central Processing Unit (CPU), or could comprise two or more processing units. For example, the processor 30 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 30 may also comprise a storage for caching purposes.

It should be understood that in FIG. 3 and FIG. 4 the different objects are schematically shown as separate objects, but this is only made to better explain the present invention. For example, in the charging station 6 the interface 38 may be part of the control unit 30 as such or arranged somewhere else in the charging station 6. Thus, all objects may be integrated in one and the same functional unit or be distributed throughout the robotic lawnmower 2 and the charging station 6, respectively. The charging contacts, best shown in FIG. 5, may for example be a part of the interfaces 28, 38 or be provided somewhere else, but in connection with the interfaces. Thus, it is the function that each object preforms that is important and not the physical location.

Turning now to FIG. 5 the communication channel between the robotic lawnmower 2 and the charging station 6. In FIG. 5, for sake of simplicity, only the interfaces 28, 38 of the robotic lawnmower 2 and the charging station 6, respectively, are shown. The two interfaces 28, 38 are more or less identical with each other, but mirror-inverted when connected to each other through the charging contacts 19, 50, as shown if FIG. 5. Thus, only interface 28 will be described in detail in order to avoid unnecessary repetition.

The interface 28 on the robotic lawnmower 2 is provided or connected to two charging contacts 19, which are adapted to interact with corresponding charging contacts 50 of the charging station 6. The interface 28, has a receiving part, Rx, for receiving signals from the charging station 6. The receiving part comprises an amplifier 55 with hysteresis, that is configured to receive data. The amplifier 55 with hysteresis may for example be an amplifier 56 and a Schmitt-trigger 60 connected in series. The interface 28 is also provided with a transmitting part, Tx, for transmitting data from the robotic mower 2 to the charging station 6. The transmitting part comprises an amplifier 56 for amplifying the signal carrying the data to be transmitted. The interface 28 also comprises an inductor 52 in the charging power path of the robotic lawnmower 2. During charging a charging power path will be established from a power source (+) on the charging station side via an inductor 54 in the interface 38, the charging contacts 50, 19, and the inductor 52 of the interface 28 to the battery 18 in the robotic lawnmower 2.

The value of the inductor is chosen such that there will be a high impedance for high frequencies in the communication channel during the charging and data transmission process.

The high impedance enables a high data transmission rate between the charging station 6 and the robotic lawnmower 2. This may be very beneficial during development and testing of the robotic lawnmower, speeding up the time to market. In an exemplary embodiment, the inductance of the inductors 52, 54 are chosen to 47 µH, which will give an impedance of 15 Ohm. This has been proven to be a good trade-off between costs and transmission speed. However, the inductance of the inductors 52, 54 may be chosen in an interval of 20 to 100 µH.

As mentioned above, both interface 28, 38 are almost identical and the interface 38 of the charging station will not be described once again, as it also comprises a receiving part, Rx, a transmitting part, Tx, and the inductor 54

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A bidirectional communication channel between a robotic lawnmower and a charging station for data communication between a first control unit in the robotic lawnmower and a second control unit in the charging station, the bidirectional communication channel comprising:
    a first interface with charging contacts provided on the robotic lawnmower, and
    a second interface with charging contacts provided on the charging station,
    wherein the first interface and the second interface are connected to each other through said charging contacts,
    wherein the first interface and the second interface and the first control unit and the second control unit are configured to communicate data in a Direct Current, DC-balanced way,
    wherein each of the first interface and the second interface is provided with an inductor in a charging power path between the charging station and the robotic lawnmower, and
    wherein each of the inductors has an impedance of at least 7 Ohm for frequencies above 50 kHz.

2. The bidirectional communication channel according to claim 1, wherein the first interface, the second interface, the first control unit, and the second control unit are configured to use Manchester encoding for DC-balancing the data transmission between the robotic lawnmower and the charging station.

3. The bidirectional communication channel according to claim 1, wherein the first interface, the second interface, the first control unit, and the second control unit are configured to use 8b/10b encoding for DC-balancing the data transmission between the robotic lawnmower and the charging station.

4. The bidirectional communication channel according to claim 1, wherein the first interface and the second interface each comprises an amplifier with hysteresis configured to receive data.

5. The bidirectional communication channel according to claim 4, wherein each amplifier with hysteresis comprises an amplifier and a Schmitt-trigger connected in series.

6. The bidirectional communication channel according to claim 1, wherein the first interface and the second interface each comprises an amplifier configured to amplify an outgoing signal.

7. The bidirectional communication channel according to claim 1, wherein an inductance of each of the inductors is in the range of 20-100 µH.

8. The bidirectional communication channel according to claim 7, wherein the inductance of each of the inductors is 47 µH.

* * * * *